(12) United States Patent
Zhang et al.

(10) Patent No.: US 11,481,130 B2
(45) Date of Patent: Oct. 25, 2022

(54) METHOD, ELECTRONIC DEVICE AND COMPUTER PROGRAM PRODUCT FOR PROCESSING OPERATION COMMANDS

(71) Applicant: EMC IP Holding Company LLC, Hopkinton, MA (US)

(72) Inventors: Zhibin Zhang, Chengdu (CN); Yalan Kuang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 17/028,173

(22) Filed: Sep. 22, 2020

(65) Prior Publication Data
US 2022/0035527 A1 Feb. 3, 2022

(30) Foreign Application Priority Data
Jul. 31, 2020 (CN) .......................... 202010756540.8

(51) Int. Cl.
*G06F 3/06* (2006.01)
*G06F 16/22* (2019.01)

(52) U.S. Cl.
CPC ............ *G06F 3/064* (2013.01); *G06F 3/0604* (2013.01); *G06F 3/0673* (2013.01); *G06F 16/2291* (2019.01)

(58) Field of Classification Search
CPC ...... G06F 3/064; G06F 3/0604; G06F 3/0673; G06F 16/2291; G06F 3/061; G06F 3/0659

USPC ............................................. 710/5; 711/154
See application file for complete search history.

(56) References Cited

U.S. PATENT DOCUMENTS

| 9,104,675 | B1 | 8/2015 | Clark et al. |
| 10,635,330 | B1* | 4/2020 | Koli .................. G06F 3/067 |
| 11,232,043 | B2 | 1/2022 | Patel et al. |
| 2010/0205350 | A1* | 8/2010 | Bryant-Rich ........... G06F 12/06 711/115 |
| 2021/0109671 | A1 | 4/2021 | Shabi et al. |
| 2022/0027059 | A1 | 1/2022 | Chen et al. |

* cited by examiner

*Primary Examiner* — Jae U Yu
(74) *Attorney, Agent, or Firm* — BainwoodHuang (57) ABSTRACT

Techniques involve determining a target identifier of an operation command if a type of the operation command is determined to be a target type, the target type indicating that the operation command is a command for acquiring data. The techniques further involve executing the operation command to acquire a target data block if it is determined that the target identifier does not exist in a historical mapping relationship between stored data blocks and identifiers of historical operation commands for the stored data blocks. The techniques further involve storing the target data block and a target mapping relationship between the target data block and the target identifier in a storage space for storing the stored data blocks and the historical mapping relationship. Accordingly, different types of commands can be quickly distinguished, thereby reducing the time for processing commands of a target type, reducing the bandwidth consumed, and improving processing efficiency.

15 Claims, 6 Drawing Sheets

METHOD, ELECTRONIC DEVICE AND COMPUTER PROGRAM PRODUCT FOR PROCESSING OPERATION COMMANDS

CROSS-REFERENCE TO RELATED APPLICATION

This application claims priority to Chinese Patent Application No. CN202010756540.8, on file at the China National Intellectual Property Administration (CNIPA), having a filing date of Jul. 31, 2020, and having "METHOD, ELECTRONIC DEVICE, AND COMPUTER PROGRAM PRODUCT FOR PROCESSING OPERATION COMMANDS" as a title, the contents and teachings of which are herein incorporated by reference in their entirety.

TECHNICAL FIELD

Embodiments of the present disclosure relate to the field of device management, and in particular, to a method, an electronic device, and a computer program product for processing an operation command.

BACKGROUND

With the development of computer technologies, increasingly more data needs to be processed. Now, a large amount of data is stored in a storage system. The storage system includes many servers to process various different data received and also receive various processing commands.

In applications of the storage system, a large number of text-based commands are used to perform various operations, such as Command-line Interface (CLI) commands, Secure Shell (SSH) commands, and XLM-based commands. These commands are used to communicate between different components of the storage system. By executing these commands, the storage system can store and manage data between various components.

SUMMARY OF THE INVENTION

The embodiments of the present disclosure provide a method, a device, and a computer program product for processing an operation command.

According to a first aspect of the present disclosure, a method for processing an operation command is provided. The method includes determining a type of a received operation command. The method further includes determining a target identifier of the operation command if it is determined that the type of the operation command indicates that the operation command is a command for acquiring data. The method further includes executing the operation command to acquire a target data block if it is determined that the target identifier does not exist in a historical mapping relationship between stored data blocks and identifiers of historical operation commands for the stored data blocks. The method further includes storing the target data block and a target mapping relationship between the target data block and the target identifier in a storage space for storing the stored data blocks and the historical mapping relationship.

According to a second aspect of the present disclosure, an electronic device is provided. The electronic device includes at least one processor; and a memory coupled to the at least one processor and having instructions stored thereon. The instructions, when executed by the at least one processor, cause the device to perform actions including: determining a type of a received operation command; determining a target identifier of the operation command if it is determined that the type of the operation command indicates that the operation command is a command for acquiring data; executing the operation command to acquire a target data block if it is determined that the target identifier does not exist in a historical mapping relationship between stored data blocks and identifiers of historical operation commands for the stored data blocks; and storing the target data block and a target mapping relationship between the target data block and the target identifier in a storage space for storing the stored data blocks and the historical mapping relationship.

According to a third aspect of the present disclosure, a computer program product is provided. The computer program product is tangibly stored on a nonvolatile computer-readable medium and includes machine-executable instructions, and the machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

In the drawings, identical or corresponding reference numerals indicate identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms should be understood as open-ended inclusion, i.e., "including but not limited to." The term "based on" should be understood as "based at least in part on." The term "one embodiment" or "this embodiment" should be understood as "at least one embodiment." The terms "first," "second," etc. may refer to different or identical objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to limit the scope of the present disclosure in any way.

In a conventional solution, components in a storage system may receive operation commands from other command issuers. For example, a server in the storage system receives an operation command sent from another server. For received operation commands, the components receiving the operation commands generally may directly execute these operation commands and then return execution results to the command issuers.

There are some operation commands in the storage system that are used only to acquire some information from a computing device and do not make any changes to data in the computing device, for example, a display command used to display configuration or resources of the computing device, or a data read command. Moreover, obtained data will generally not be changed within a predetermined period of time. These commands may also be referred to as static commands. There are also some commands in the storage system that are used to change data in the storage system, for example, commands for changing configuration of a memory or commands for adjusting data in an electronic device, such as a data migration command. These commands may also be referred to as dynamic commands, and the data acquired or processed by them changes frequently.

As the number of available resources increases, it may take a lot of time to execute these commands, especially when static commands are processed. This makes the computing device to take a relatively long time to process commands, which is relatively inefficient.

In order to solve the above problems and other problems, a method for processing an operation is proposed in the present disclosure. In the method, a computing device determines a type of a received operation command. The computing device determines a target identifier of the operation command if the type indicates that the operation command is a command for acquiring data. The computing device executes the operation command if the target identifier does not exist in a historical mapping relationship between stored data blocks and identifiers of historical operation commands for the stored data blocks, so as to acquire a target data block and store the target data block. The computing device further stores a mapping relationship between the target data block and the target identifier. As such, the stored mapping relationship can be used to quickly obtain the target data block next time the operation command is executed. In this way, different types of commands can be quickly distinguished, thereby reducing the time for processing commands for acquiring data, reducing the bandwidth consumed, and improving the processing efficiency of operation commands.

Figure 1:
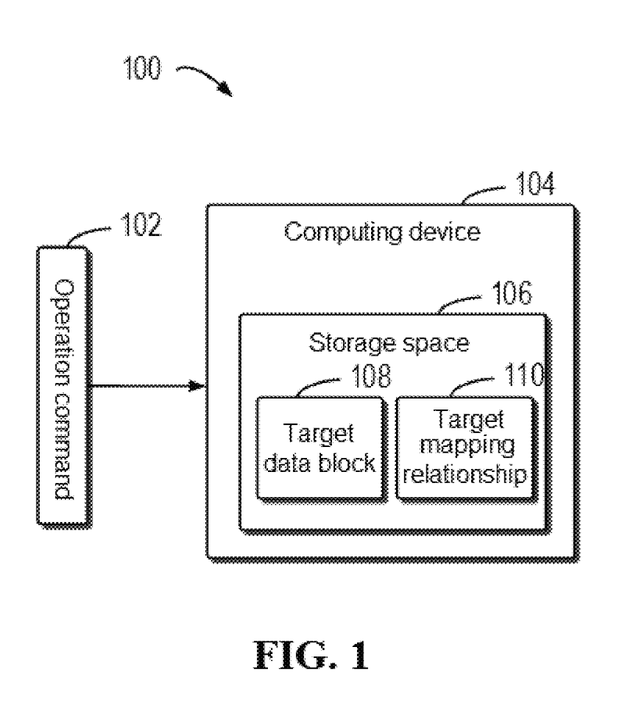
FIG. 1 is a schematic diagram of example environment 100 in which a device and/or a method according to an embodiment of the present disclosure may be implemented.

FIG. 1 below is a schematic diagram of example environment 100 in which a device and/or a method according to an embodiment of the present disclosure may be implemented.

As shown in FIG. 1, example environment 100 includes computing device 104. Computing device 104 is configured to process various received various operation commands 102.

Computing device 104 includes, but is not limited to, a personal computer, a server computer, a handheld or laptop device, a mobile device (such as a mobile phone, a personal digital assistant (PDA), or a media player), a multi-processor system, a consumer electronic product, a minicomputer, a mainframe computer, a distributed computing environment including any one of the above systems or devices, and the like.

Computing device 104 receives operation command 102 from other computing devices, for example, other servers in a storage system. Operation command 102 can be used to cause computing device 104 to perform various operations.

After receiving operation command 102, computing device 104 will determine a type of operation command 102 to determine whether received operation commands 102 is operation command 102 of a target type. The target type indicates whether operation command 102 is a command for acquiring data, for example, a static command, or a command of another type that needs to adjust data in computing device 104, for example, a dynamic command.

In some embodiments, computing device 104 collects operation commands of the target type and operation commands of other types to train a classification model, so that the classification model can classify input commands. For example, a Latent Semantic Indexing (LSI) model, a Doc2vec model, a Term Frequency-inverse Document Frequency (TF-IDF) model, and the like may be trained to obtain a classification model.

In some embodiments, the classification model classifies operation commands into a target type or a non-target type. In an example, the target type is a static type used only to acquire data from a computing device, and the non-target type is a dynamic type used to adjust data in a computing device. In another example, the target type is a type used to acquire data from a computing device, and the non-target type is not limited to one type and may include any suitable number of types. The above examples are only intended to describe the present disclosure, not to specifically limit the present disclosure.

In some embodiments, computing device 104 may further classify pre-collected various operation commands into a target type or a non-target type in advance, and then compare received command 102 with the commands pre-classified as the target type to determine whether operation command 102 is of the target type.

Computing device 104 includes storage space 106. Storage space 106 is used to store data blocks, and is further used to store a historical mapping relationship between the stored data blocks and identifiers of historical operation commands for the stored data blocks. In an example, storage space 106 is part of a memory of computing device 104. In an example, storage space 106 is a dedicated storage component in computing device 104. The above examples are only intended to describe the present disclosure, not to specifically limit the present disclosure.

When operation command 102 is of the target type, it is determined whether a target identifier exists in a historical mapping relationship between stored data blocks and identifiers of historical operation commands for the stored data blocks in storage space 106. If the target identifier exists, target data block 108 corresponding to the target identifier is acquired from the stored data blocks and returned to an issuer of operation command 102. The historical mapping relationship between stored data blocks and identifiers of historical operation commands is described below with reference to FIG. 2.

If the target identifier does not exist in the historical mapping relationship, operation command 102 needs to be executed to acquire target data block 108 which is returned to the issuer of operation command 102. Then, computing device 104 determines, based on a size of storage space 106, whether to store target data block 108 and target mapping relationship 110 between target data block 108 and the target identifier.

Through the above method, different types of commands can be quickly distinguished, thereby reducing the time for processing commands of a target type, reducing the bandwidth consumed, and improving the processing efficiency of operation commands.

Figure 2:
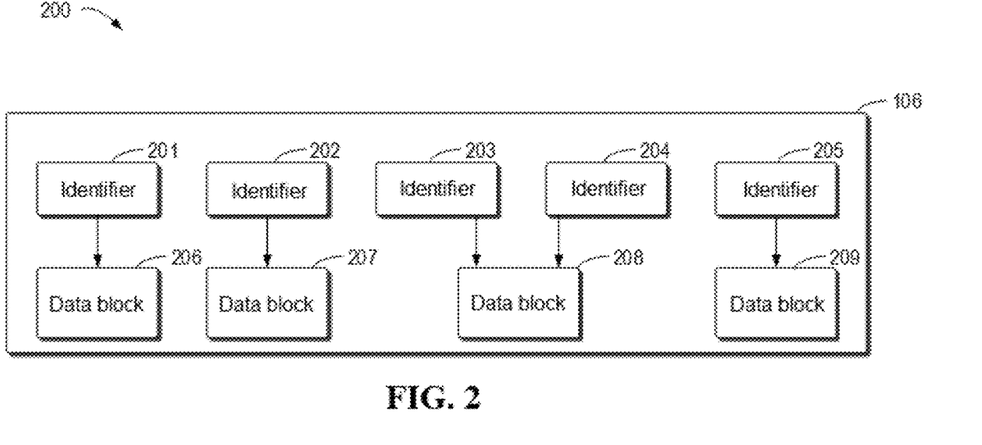
FIG. 2 is a schematic diagram of historical mapping relationship 200 between stored data blocks and identifiers of historical operation commands according to an embodiment of the present disclosure.

The schematic diagram of environment 100 in which a device and/or a method according to an embodiment of the present disclosure may be implemented has been described above with reference to FIG. 1. A historical mapping relationship between stored data blocks and identifiers of historical operation commands according to an embodiment of the present disclosure is described below with reference to FIG. 2. FIG. 2 is a schematic diagram of historical mapping relationship 200 between stored data blocks and identifiers of historical operation commands according to an embodiment of the present disclosure.

As shown in FIG. 2, identifiers 201, 202, 203, 204, and 205 of historical operation commands in storage space 106 are used to identify five commands of different target types, and data blocks 206, 207, 208, and 209 correspond to these commands. In an example, identifiers 201, 202, 203, 204, and 205 of the historical operation commands are hash values of the historical operation commands. Metadata of each data block includes the number of uses of the data block and remaining duration. Data blocks 206, 207, 208, and 209 are sorted according to the numbers of uses and the remaining duration. If data block 208 is referenced by two identifiers, it indicates that the number of uses of data block 208 is at least 2. When a data block is stored in storage space 106, it is allocated remaining duration of existence, which decreases as the existence time in storage space 106 increases.

In some embodiments, if the remaining duration is 0, the data block is deleted from storage space 106. Alternatively, when the remaining duration is 0, if storage space 106 is not full, the data block may temporarily not be deleted, but will be deleted after storage space 106 is full. In some embodiments, the data blocks are sorted first based on the numbers of uses and then based on the remaining duration. The above examples are only intended to describe the present disclosure, not to specifically limit the present disclosure.

The schematic diagram of mapping relationship 200 between stored data blocks and identifiers of historical operation commands according to an embodiment of the present disclosure has been described above with reference to FIG. 2. Method 300 for processing an operation command according to an embodiment of the present disclosure is described below with reference to FIG. 3. Method 300 may be performed at computing device 104 in FIG. 1 or any other suitable devices.

Figure 3:
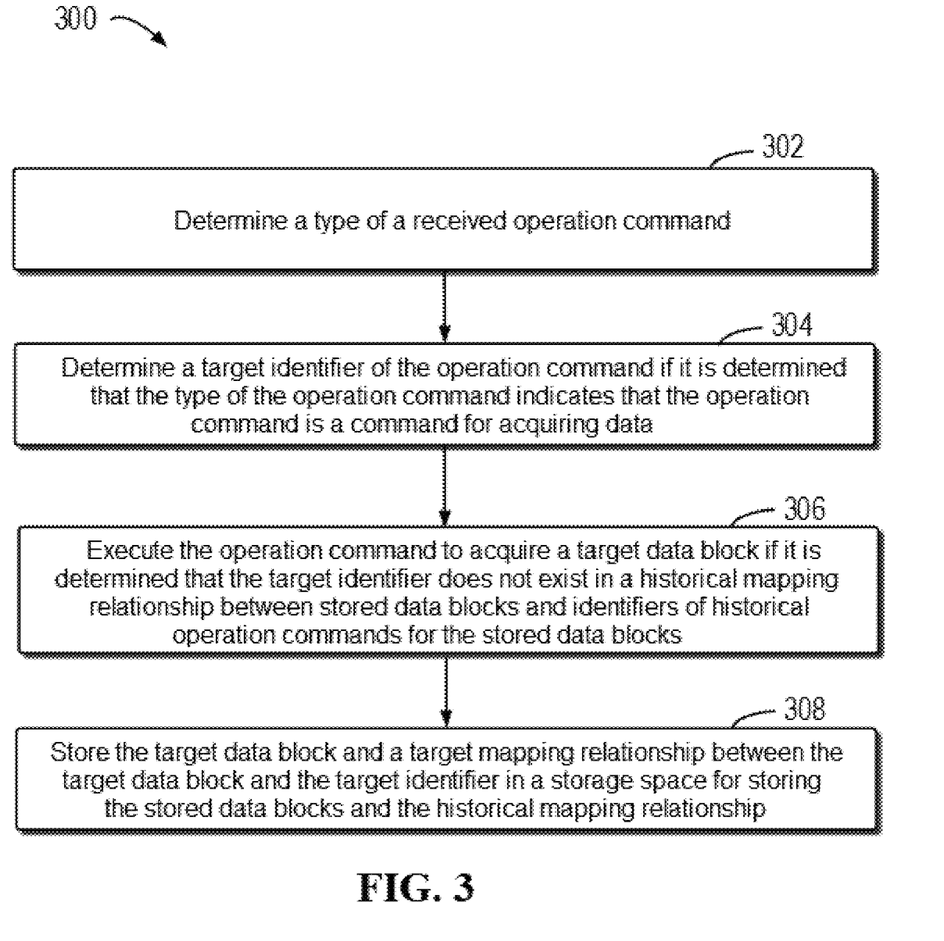
FIG. 3 is a flowchart of method 300 for processing an operation command according to an embodiment of the present disclosure.

In block 302, computing device 104 determines a type of received operation command 102. Computing device 104 may receive various commands from another computing device or component. Upon receiving these commands, computing device 104 will determine types of these commands.

In some embodiments, a classification model runs in computing device 104. Received operation command 102 is input into the classification model to determine the type of operation command 102. In this way, the type of operation command 102 can be automatically and quickly determined without manual intervention. Processes of training the classification model and using the classification model for classification will be described below with reference to FIG. 5 and FIG. 6.

In block 304, computing device 104 determines a target identifier of operation command 102 if determining that the type of operation command 102 indicates that the operation command is a command for acquiring data. Computing device 104 is configured to determine whether the operation command is of a target type. When computing device 104 determines that operation command 102 is an operation command for acquiring data without adjusting the data in the computing device, the identifier of the operation command is determined.

In some embodiments, computing device 104 performs a hash operation on content in operation command 102 to determine the target identifier. In this way, the target identifier of the operation command can be quickly determined, thereby saving the processing time. In some embodiments, the target identifier of the operation command can be obtained in any suitable manner. The above examples are only intended to describe the present disclosure, not to specifically limit the present disclosure.

A historical mapping relationship between stored data blocks and identifiers of historical operation commands for the stored data blocks and the stored data blocks are stored in storage space 106 of computing device 104. Computing device 104 determines whether a target identifier exists in the historical mapping relationship. When determining that the target identifier exists in the historical mapping relationship, computing device 104 acquires a target data block corresponding to the target identifier based on the historical mapping relationship. Through the method, a data block corresponding to an operation command can be quickly obtained. The processing efficiency of the command is improved, and the time for executing the command is reduced.

In block 306, computing device 104 executes operation command 102 to acquire target data block 108 if determining that the target identifier does not exist in the historical mapping relationship between stored data blocks and identifiers of historical operation commands for the stored data blocks. When computing device 104 does not find the target identifier from the historical mapping relationship, it indicates that the instruction has not been stored in the storage space. In this case, operation command 102 is executed to acquire the corresponding data block.

In block 308, computing device 104 stores target data block 108 and target mapping relationship 110 between target data block 108 and the target identifier in storage space 106 for storing the stored data blocks and the historical mapping relationship. The process of storing target data block 108 and target mapping relationship 110 in storage space 106 will be described below with reference to FIG. 4.

Through the above method, different types of commands can be quickly distinguished, thereby reducing the time for processing commands of a target type, reducing the bandwidth consumed, and improving the processing efficiency of operation commands.

Figure 4:
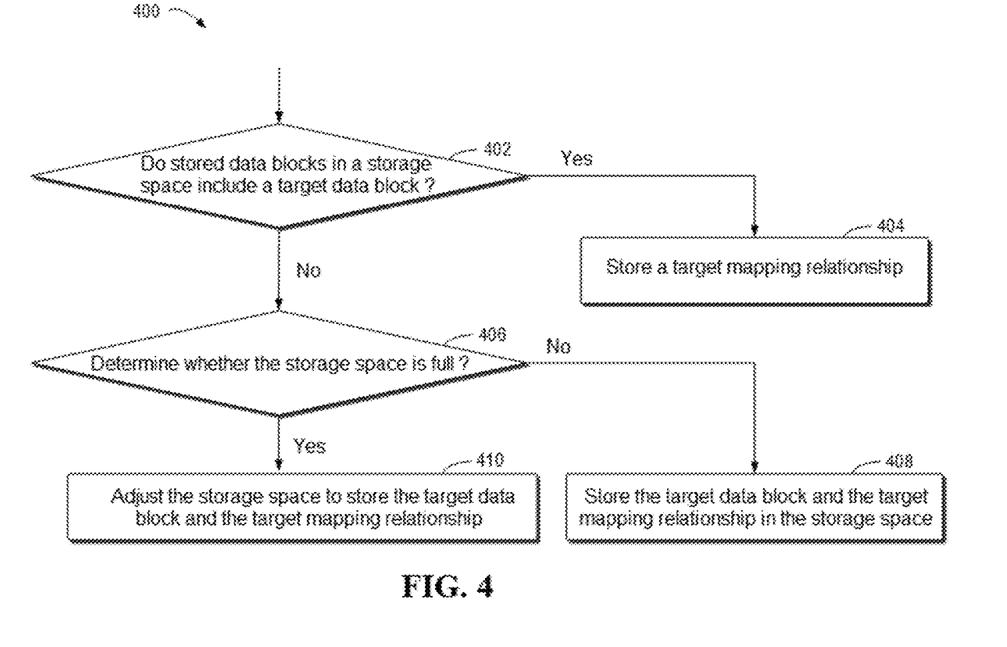
FIG. 4 is a flowchart of method 400 for storing a target data block and a target mapping relationship according to an embodiment of the present disclosure.

The schematic diagram of method 300 for processing an operation command according to an embodiment of the present disclosure has been described above with reference to FIG. 3. The process of storing the target data block and the target mapping relationship will be described below with reference to FIG. 4. FIG. 4 is a flowchart of method 400 for storing a target data block and a target mapping relationship according to an embodiment of the present disclosure. Method 400 in FIG. 4 may be implemented by computing device 104 in FIG. 1 or any other suitable devices.

In block 402, computing device 104 determines whether stored data blocks in storage space 106 include target data block 108. Storage space 106 stores stored data blocks obtained by executed operation commands of a target type. In an example, computing device 104 compares obtained target data block 108 with the stored data blocks to determine whether target data block 108 exists in the stored data blocks.

In block 404, computing device 104 stores target mapping relationship 110 if determining that the stored data blocks include target data block 108. In this case, it indicates that target data block 108 has been stored in storage space 106, and only target mapping relationship 110 needs to be stored. In this way, a mapping relationship can be quickly stored, and the time to save a data block is reduced, thereby improving the data processing efficiency.

In block 406, computing device 104 determines whether storage space 106 is full if determining that the stored data blocks do not include target data block 108. Since the stored data blocks do not include target data block 108, it indicates that both target data block 108 and target mapping relationship 110 need to be stored. Therefore, it is necessary to determine whether there is a space for storing target data block 108 and target mapping relationship 110 in storage space 106.

In block 408, computing device 104 stores target data block 108 and target mapping relationship 110 in storage space 106 if determining that storage space 106 is not full.

In block 410, computing device 104 adjusts the storage space to store target data block 108 and target mapping relationship 110 if determining that storage space 106 is full. If storage space 106 is full, it indicates that there is no space for storing target data block 108 and target mapping relationship 110 at this time, and that storage space 106 needs to be adjusted to determine whether a storage space for storing target data block 108 and target mapping relationship 110 can be obtained.

In some embodiments, computing device 104 determines the number of uses of target data block 108 and remaining duration during which target data block 108 can be saved in storage space 106. When the target data block is generated, target data block 108 may be allocated the number of uses and remaining duration. For example, the number of uses is 1, and the remaining duration is 10 minutes. The stored data blocks in storage space 106 also have numbers of uses and remaining durations. The remaining duration of a stored data block is a current remaining duration determined from an initial remaining duration allocated upon the stored data block being generated minus the duration for which the data block has been saved, and the number of uses thereof is the number of times the data block is selected.

Computing device 104 then determines a priority of target data block 108 based on the number of uses and the remaining duration. Computing device 104 compares the number of uses and the remaining duration of target data block 108 with the numbers of uses and the remaining durations of the stored data blocks in storage space 106 to determine the priority of the target data block. In an example, the number of uses may be compared first, and if the number of uses is the same, the remaining duration is compared. The above examples are only intended to describe the present disclosure, not to specifically limit the present disclosure.

If determining that the priority of target data block 108 is higher than the priority of at least one of the stored data blocks, computing device 104 deletes the at least one stored data block and its corresponding mapping relationship from storage space 106 to store the target data block and the target mapping relationship. In this way, content in the storage space can be automatically adjusted, and expiration of data blocks of the storage space can be controlled based on a predetermined rule, which increases the duration of usage of data blocks with a relatively large number of uses and improves data utilization.

Through the above method, data blocks and target mapping relationships obtained by various commands can be quickly and self-adaptively stored, which improves the efficiency of automatic processing and saves processing time.

Figure 5:
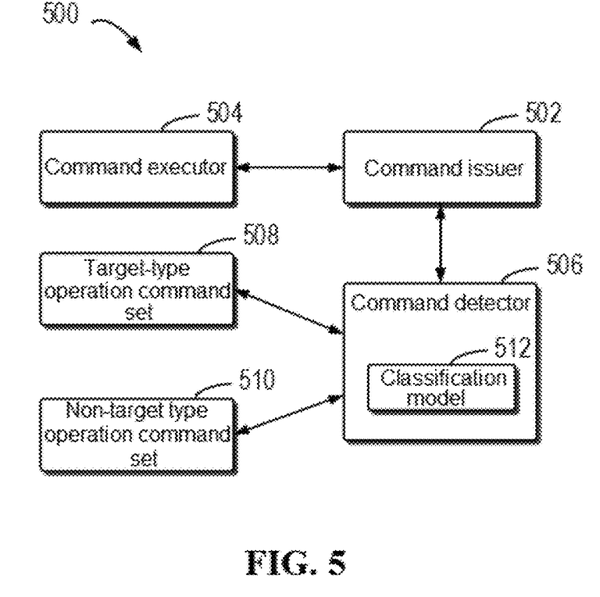
FIG. 5 is a schematic diagram of process 500 for training a classification model according to an embodiment of the present disclosure.
Figure 6:
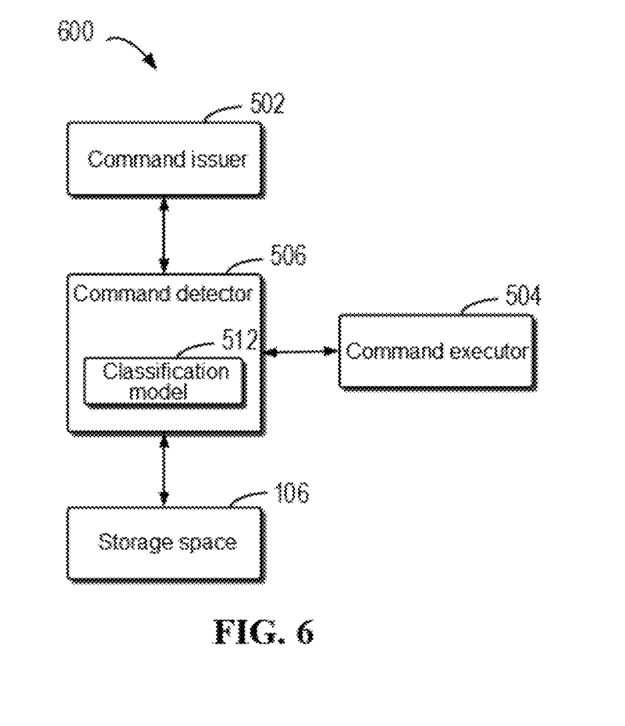
FIG. 6 is a schematic diagram of process 600 of using a classification model according to an embodiment of the present disclosure.

The flowchart of method 400 for storing a target data block and a target mapping relationship according to an embodiment of the present disclosure has been described above with reference to FIG. 4. Processes of training and using a classification model for classifying operation commands are described below with reference to FIG. 5 and FIG. 6. FIG. 5 is a schematic diagram of process 500 for training a classification model according to an embodiment of the present disclosure. FIG. 6 is a schematic diagram of process 600 of using a classification model according to an embodiment of the present disclosure.

As shown in FIG. 5, command issuer 502 sends a command to command executor 504 for execution. The command issuer further sends an operation command to command detector 506. If the operation command is a target-type command for acquiring a data block, for example, a command for acquiring configuration information, the operation command is saved in target-type operation command set 508. If the operation command is a non-target type command not for acquiring a data block, for example, a command for adjusting a data storage position, the operation command is saved to non-target type operation command set 510.

Then, a machine learning model is trained with target-type operation command set 508 and non-target type operation command set 510 to obtain classification model 512.

As shown in FIG. 6, after classification model 512 is obtained, when an operation command is received from command issuer 502, the operation command is sent to command detector 506, and then a type of the operation command is determined through classification model 512. If it is not an operation command of a target type, the operation command is sent to command executor 504 for execution. Then, a processing result is returned to command issuer 502.

If it is an operation command of a target type, an identifier of the operation command is generated. Then, it is determined whether the identifier exists in storage space 106. If the identifier exists in storage space 106, it indicates that the instruction has been executed before, and that a data block of the operation command exists in storage space 106. The data block is directly returned.

If the identifier does not exist in storage space 106, it means that the command is not stored in storage space 106, and the operation command needs to be sent to command executor 504 for execution. A data block obtained by executing the command is returned to command issuer 502, and meanwhile, it is also necessary to determine whether to store the data block and a mapping relationship between the data block and the operation command in storage space 106.

If the data block exists in storage space 106, the mapping relationship is directly stored, and the number of uses of the data block is increased by 1. If the data block does not exist in storage space 106, it is necessary to determine whether storage space 106 is full. If storage space 106 is not full, the number of uses and a remaining time are allocated to the data block. For example, the remaining time is 10 minutes, and the number of uses is 1. If the storage space is full, a priority of the stored data block needs to be determined based on the allocated number of uses and remaining time.

If the priority of the data block determined with the number of uses and the remaining duration is higher than that of at least one stored data block in the storage space, the stored data block and its mapping relationship are deleted. Then, the data block and its mapping relationship are saved. If the priority of the data block is lower than priorities of all stored data blocks, the data block and its mapping relationship are not saved.

Through the above method, data blocks and target mapping relationships obtained by various commands can be quickly and self-adaptively stored, which improves the efficiency of automatic processing and saves processing time.

Figure 7:
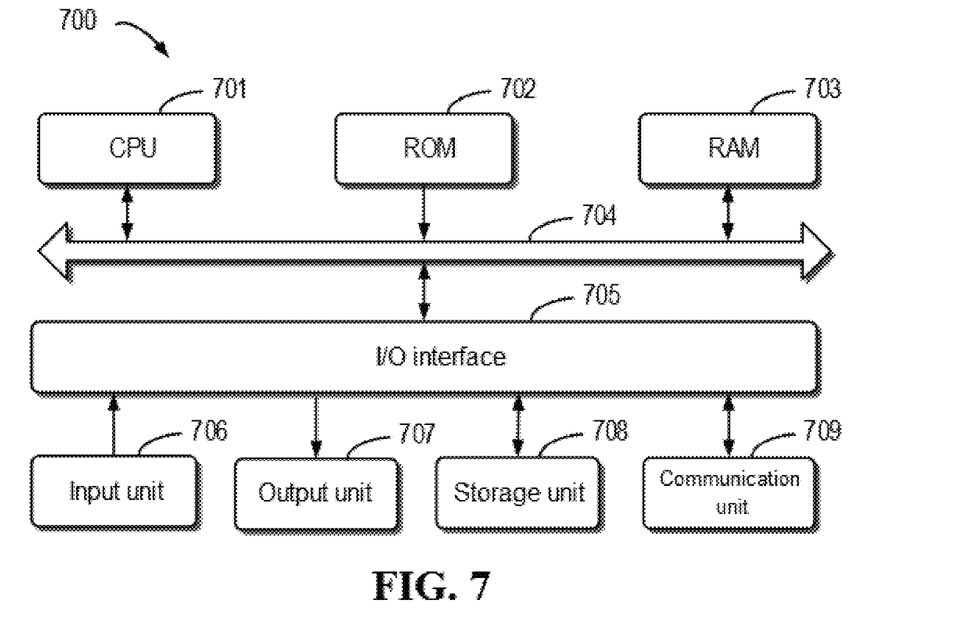
FIG. 7 is a schematic block diagram of example device 700 adapted to implement an embodiment of content of the present disclosure.

FIG. 7 is a schematic block diagram of example device 700 that can be configured to implement an embodiment of content of the present disclosure. For example, computing device 104 as shown in FIG. 1 may be implemented by device 700. As shown in the figure, device 700 includes central processing unit CPU 701 that can perform various appropriate actions and processing according to computer program instructions stored in read-only memory ROM 702 or computer program instructions loaded from storage unit 708 to random access memory RAM 703. Various programs and data required for the operation of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, such as method 300 and method 400, may be performed by processing unit 701. For example, in some embodiments, methods 300 and 400 may be implemented as a computer software program that is tangibly included in a machine-readable medium such as storage unit 708. In some embodiments, part or all of the computer program may be loaded and/or installed onto device 700 via ROM 702 and/or communication unit 709. When the computer program is loaded into RAM 703 and executed by CPU 701, one or more actions of methods 300 and 400 described above can be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagating freely, electromagnetic waves propagating through waveguides or other transmission media (e.g., light pulses propagating through fiber-optic cables), or electrical signals transmitted over electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer may be connected to a user computer over any kind of networks, including a local area network (LAN) or wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus/system, and the computer program product according to embodiments of the present disclosure. It should be appreciated that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for processing an operation command, comprising:

determining a type of a received operation command;

determining a target identifier of the received operation command if it is determined that the type of the received operation command indicates that the received operation command is a command for acquiring data;

executing the received operation command to acquire a target data block if it is determined that the target identifier does not exist in a historical mapping relationship between stored data blocks and identifiers of historical operation commands for the stored data blocks; and storing the target data block and a target mapping relationship between the target data block and the target identifier in a storage space for storing the stored data blocks and the historical mapping relationship.

2. The method according to claim 1, wherein storing the target data block and the target mapping relationship comprises:

determining whether the stored data blocks in the storage space comprise the target data block; and storing the target mapping relationship if it is determined that the stored data blocks comprise the target data block.

3. The method according to claim 2, further comprising:

determining whether the storage space is full if it is determined that the stored data blocks do not comprise the target data block;

storing the target data block and the target mapping relationship in the storage space if it is determined that the storage space is not full; and adjusting the storage space to store the target data block and the target mapping relationship if it is determined that the storage space is full.

4. The method according to claim 3, wherein adjusting the storage space comprises:
   determining the number of uses of the target data block and remaining duration during which the target data block can be saved in the storage space;
   determining a priority of the target data block based on the number of uses and the remaining duration; and
   deleting, if it is determined that the priority of the target data block is higher than a priority of at least one of the stored data blocks, the at least one stored data block and its corresponding mapping relationship from the storage space to store the target data block and the target mapping relationship.

5. The method according to claim 1, further comprising:
   acquiring a target data block corresponding to the target identifier based on the historical mapping relationship if it is determined that the target identifier exists in the historical mapping relationship.

6. The method according to claim 1, wherein determining the type comprises:
   inputting the operation command into a classification model to determine the type of the operation command.

7. The method according to claim 1, wherein determining the target identifier comprises:
   performing a hash operation on content in the operation command to determine the target identifier.

8. An electronic device, comprising:
   at least one processor; and
   a memory coupled to the at least one processor and having instructions stored thereon, wherein when executed by the at least one processor, the instructions cause the device to perform actions comprising:
      determining a type of a received operation command;
      determining a target identifier of the received operation command if it is determined that the type of the received operation command indicates that the received operation command is a command for acquiring data;
      executing the received operation command to acquire a target data block if it is determined that the target identifier does not exist in a historical mapping relationship between stored data blocks and identifiers of historical operation commands for the stored data blocks; and
      storing the target data block and a target mapping relationship between the target data block and the target identifier in a storage space for storing the stored data blocks and the historical mapping relationship.

9. The electronic device according to claim 8, wherein storing the target data block and the target mapping relationship comprises:
   determining whether the stored data blocks in the storage space comprise the target data block; and
   storing the target mapping relationship if it is determined that the stored data blocks comprise the target data block.

10. The electronic device according to claim 9, wherein the actions further comprise:
    determining whether the storage space is full if it is determined that the stored data blocks do not comprise the target data block;
    storing the target data block and the target mapping relationship in the storage space if it is determined that the storage space is not full; and
    adjusting the storage space to store the target data block and the target mapping relationship if it is determined that the storage space is full.

11. The electronic device according to claim 10, wherein adjusting the storage space comprises:
    determining the number of uses of the target data block and remaining duration during which the target data block can be saved in the storage space;
    determining a priority of the target data block based on the number of uses and the remaining duration; and
    deleting, if it is determined that the priority of the target data block is higher than a priority of at least one of the stored data blocks, the at least one stored data block and its corresponding mapping relationship from the storage space to store the target data block and the target mapping relationship.

12. The electronic device according to claim 8, wherein the actions further comprise:
    acquiring a target data block corresponding to the target identifier based on the historical mapping relationship if it is determined that the target identifier exists in the historical mapping relationship.

13. The electronic device according to claim 8, wherein determining the type comprises:
    inputting the operation command into a classification model to determine the type of the operation command.

14. The electronic device according to claim 8, wherein determining the target identifier comprises:
    performing a hash operation on content in the operation command to determine the target identifier.

15. A computer program product having a non-transitory computer readable medium which stores a set of instructions to process an operation command; the set of instructions, when carried out by computerized circuitry, causing the computerized circuitry to perform a method of:
    determining a type of a received operation command;
    determining a target identifier of the received operation command if it is determined that the type of the received operation command indicates that the received operation command is a command for acquiring data;
    executing the received operation command to acquire a target data block if it is determined that the target identifier does not exist in a historical mapping relationship between stored data blocks and identifiers of historical operation commands for the stored data blocks; and
    storing the target data block and a target mapping relationship between the target data block and the target identifier in a storage space for storing the stored data blocks and the historical mapping relationship.

* * * * *